United States Patent

Frischkorn et al.

[15] 3,655,574
[45] Apr. 11, 1972

[54] OPTICAL BRIGHTENING COMPOSITION MIXTURE OF THREE ANALOGOUS COMPOUNDS

[72] Inventors: Hans Frischkorn; Erich Schinzel, both of Hofheim/Taunus; Gunter Rosch, Altenhain/Taunus, all of Germany

[73] Assignee: Farbwerke Hoechst Aktiengesellschaft vormals Meister Lucius & Bruning, Frankfurt/Main, Germany

[22] Filed: Jan. 12, 1970

[21] Appl. No.: 2,396

[30] Foreign Application Priority Data

Jan. 18, 1969 Germany..................P 19 02 445.4

[52] U.S. Cl. ...................................252/301.2 W, 260/240 B
[51] Int. Cl............................................................Co9k 1/02
[58] Field of Search ..........................252/301.2 W, 301.3 W; 260/240 B

[56] References Cited

UNITED STATES PATENTS

| | | | |
|---|---|---|---|
| 3,309,363 | 3/1967 | Buell | 252/301.2 W |
| 3,406,118 | 10/1968 | Tscharner et al. | 252/301.2 W |

FOREIGN PATENTS OR APPLICATIONS

| | | | |
|---|---|---|---|
| 1,554,480 | 12/1968 | France | 252/301.2 W |

*Primary Examiner*—Robert D. Edmonds
*Attorney*—Curtis, Morris & Safford

[57] ABSTRACT

An optical brightener composition consisting of an unsymmetrical bis-triazinylamino-stilbene disulfonic acid and of the two corresponding symmetrical compounds is superior to the single components as regards the degree of whiteness obtained thereby and the multiplicity of applications for brightening of fibrous materials of cellulosic and polyamide fibers.

7 Claims, No Drawings

OPTICAL BRIGHTENING COMPOSITION MIXTURE OF THREE ANALOGOUS COMPOUNDS

The present invention relates to optical brightener compositions consisting of an unsymmetrical bis-(diaminotrizinyl-amino)-stilbene disulfonic acid and of the two corresponding symmetrical compounds.

A further object of this invention is an advantageous method of preparing said compositions.

Further objects of this invention are a variety of applications of said composition of matter. Still further objects appear to anyone skilled in the art from the following disclosure.

It is already known from French Pat. No. 1,554,480 (patented Dec. 9, 1968, to Fritz Fleck, assignor to Sandoz S.A.) to prepare unsymmetrical optical brighteners by condensation of 2 mols of a cyanuric acid halide, 1 mol of 4,4-diamino-stilbene-2,2'-disulfonic acid or a salt thereof, 2 mols (taken together) of aniline and chloroaniline and 2 mols of a further amine, e.g. morpholine, in any sequence. It is stated that, when using in one step a mixture of aniline and chloroaniline, symmetrical compounds are obtained to some extent, too. The compounds are said to be useful as brightening agents for polyamide and cellulosic fibres.

From U.S. Pat. No. 3,132,106 (patented May 5, 1964, to F. G. Villaume assignor to American Cyanamide Company) a brightener composition is known which consists of the unsymmetrical condensation product of 1 mol 4,4'-diaminostilbene-2,2'-disulfonic acid, 2 mols of ethanolamine and, taken together, 2 mols of meta- and paraaminobenzene-sulfonic acid, together with the corresponding symmetrical compounds. The composition is said to be useful as optical brightener for paper.

In both these patents it is also described to prepare the pure unsymmetrical compound by condensation of 4-amindo-4'-nitro-stilbene-2,2'-disulfonic acid with cyanuric acid halide and with said amines in two different steps, reduction of the nitro group, e. g. with iron, to the amino group, condensation with a cyanuric acid halide and addition in two different steps, of the amines, but using in one step of the amine addition another amine than those added to the nitro intermediate.

It now has been found that derivatives of bis-triazinyl-amino-stilbene-disulfonic acid being a mixture of compounds of the general formulae I, II and III

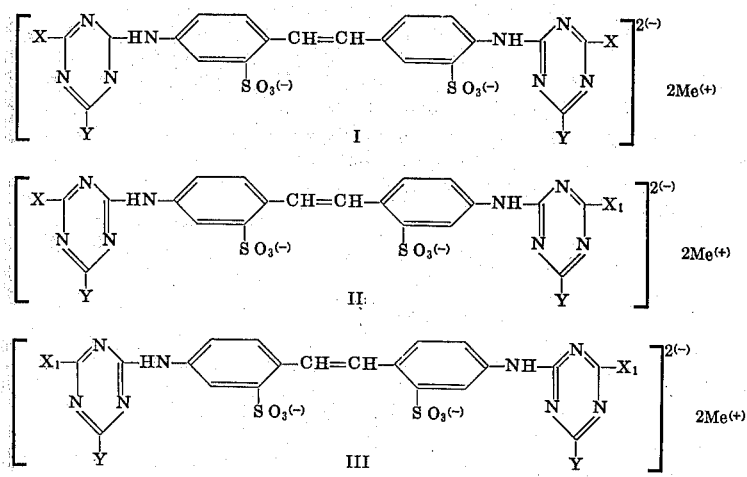

in which X stands for an anilino group, $X_1$ stands for a morpholyl group, Y stands for a morpholyl or diethanolamino group and $Me^+$ stands for the hydrogen ion, and alkali metal cation, the ammonium ion or, preferably, a quaternary ammonium ion deriving from an aliphatic primary, secondary or tertiary amine, preferably containing hydroxy groups, can be prepared by a particularly advantageous method consisting of:

reacting an alkali metal salt of the condensation product of 1 equivalent of 4,4'-diaminostilbene-(2,2')-disulfonic acid and 2 equivalents of cyanuric acid chloride having the formula IV

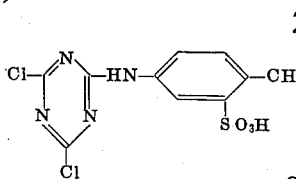
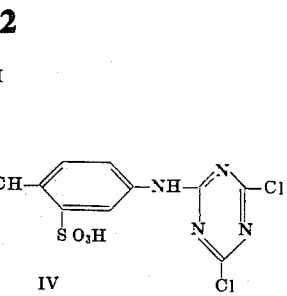

in the second condensation step at temperatures of 0°–50° C., preferably 10°–40° C, successively, with together 2 equivalents, preferably one equivalent of each of the amines of the formulae HX and $HX_1$ or, alternatively, with a mixture containing, preferably, one equivalent each of said amines and reacting, in the 3rd condensation step, the so-obtained intermediate, at a temperature not exceeding 100° C., with at least 2 equivalents, preferably an excess of no more than 4 equivalents of amine of formula

HY and isolating the final condensation product as the free acid by acidification up to a pH of about 4.

The salts of the bis-triazinyl aminostilbene-disulfonic acid derivatives of the present invention are obtained by transformation of the free acids with salt forming agents, such as alkali metal hydroxides, sodium carbonate or sodium hydrogen carbonate, potassium carbonate, ammonia, or, more especially, with an aliphatic primary, secondary or tertiary amine the aliphatic moiety of which preferably contains hydroxy groups, e.g. ethanol-, diethanol-, or triethanol amine. The fact that the bis-tri-azinylamino-stilbene-disulfonic-acid derivatives provided by the present process are composed of a mixture of the compounds of the formulae I, II, III is, among others, evidenced by thin-layer chromatography using authentic samples of the single constituents.

For statistical reasons, the bis-triazinylamino-stilbene-disulfonic acid derivatives obtained by the present process should contain, with equimolar amounts of the amines HX and $HX_1$ used, the components I, II and III in a molar ratio of ¼: ½: ¼. A test carried out by thin-layer chromatography on various concentrations enabled to estimate that his statistically required ratio is in the above case approximately attained.

It is, of course, likewise possible to prepare separately by the methods hereinbefore mentioned, the single components of the composition of the invention, to mix them, subsequently, in an optional ratio and to use the resulting mixture according to the invention. However, said procedure does not offer an advantage over the method of preparation as proposed by the present invention.

Moreover, the mixtures of the bis-triazinylamino-stilbene-disulfonic acid derivatives of the invention showed to be excellently suitable as optical brighteners for fabrics made from cellulosic or polyamide fibers. In contradistinction to the great number of known brightening agents of the same series of compounds (cf. Ullmann: Enzyklopadie der technischen Chemie, 3rd edition, vol. 11 (1960) page 690 et sequ.) the compositions of the invention consisting of unsymmetrical compounds are distinguished by an extraordinary multiplicity of applications. They yield on cotton, when applied by the exhausting process or in a peroxide bleaching bath at temperatures above 100° C, excellent brightening effects. However, a particularly high degree of whiteness is achieved by the padding process. Also in crease resistance finishing of cotton according to the wet-, moist-(thermoprocess yielding a material with a residual moisture about 5 to 10 percent by weight) or dry cross-linking method of reactant resins, a remarkable degree of whiteness is attained. Moreover, very Then a solution of 12.5 parts of aniline in 40 parts of acetone was added and the whole was heated for 1 hour to 40° C. while maintaining a pH between 5 and 6 by addition of about 67 parts of 3 N sodium carbonate solution. After 11.6 parts of morpholine had been added, the batch was heated for another hour to 40° C., the pH being maintained between 5 and 6 by dropwise addition of 67 parts of a 3 N sodium carbonate solution. Finally, 80 parts of diethanolamine were added and the whole heated to 97°–100° C. while distilling off aqueous acetone at a descending condenser. After refluxing for 5 hours, the pH was adjusted to 4 by addition of about 35 parts of concentrated hydraulic acid, the precipitate was suction-filtered after cooling and washed neutral with water. After drying, 122 parts of a product were obtained containing the compounds of the formula Ia, IIa and IIIa

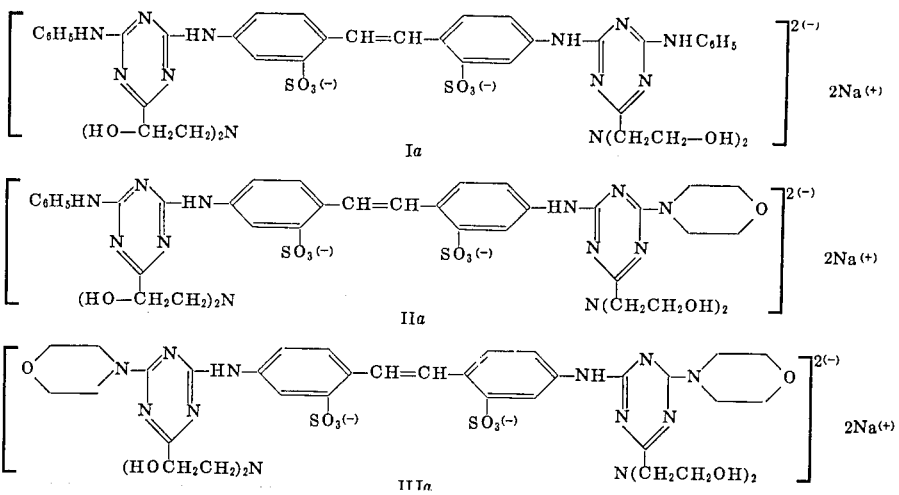

good bleaching effects are obtained also on polyamide fibre. Particularly, at temperatures below 100° C., preferably 80° C., on polyamide fibers of the type of polycaprolactam excellent bleaching effects of a bluish tint are produced that can still be slightly improved by adding reducing bleaching agents.

The compounds of the invention show, when applied as optical brighteners on said types of fibers under the most various conditions of application, an outstanding degree of whiteness. They are distinctly superior to the hitherto known single compounds of the bis-triazinylamino-stilbene-disulfonic acid group especially in regard to their very good brightening effects in connection with a great variety of applications.

The salts of the products of the invention with an aliphatic primary, secondary or tertiary amine which preferably contains hydrochloric groups are, above all, suitable for the manufacture of highly concentrated liquid preparations. In the textile industry, preferred use is made of said preparations in particular for continuous processes presently increasingly adopted in practice because of the need for rapid dosage and redosage of the brightener and since avoiding the time-consuming and complicated process of pre-dissolving the commercial powders. A further advantage of the liquid preparations consists in that they do not dust.

The following examples serve to illustrate the invention. The parts and percentages are by weight unless otherwise mentioned.

EXAMPLE 1

Fifty parts of cyanuric acid chloride were dissolved in 220 parts of acetone and the solution was poured onto 960 parts of a mixture of ice and water. Subsequently, a solution of 49.5 parts of 4,4′-diamino-stilbene-(2,2′)-disulfonic acid in 390 parts of water and 36 parts of concentrated sodium hydroxide solution were allowed to run into the mixture while maintaining the pH value between 2.5 and 3.5 by simultaneous dropwise addition of about 115 parts of 3N sodium carbonate solution. The whole was allowed to react during 1½ hours until no more 4,4′-diamino-stilbene-disulfonic acid could be traced.

in form of the free disulfonic acid. The yield amounted to 95 percent of the theory taking into consideration a residual moisture of 5 percent.

A product of the same composition was obtained, when in a second condensation step a mixture of 12.5 parts of aniline and 11.6 parts of morpholine, dissolved in 40 parts of acetone, were added and the whole was allowed to react at 40° C.

After it had been transformed into its sodium salt, the so-obtained product was separated in the thin-layer chromatogram on kieselgel GF $_{254}$ (of E. Merck A.G.) according to STAHL into 3 main spots using as eluent a mixture of n-hexanol, pyridine, acetic acid ethyl ester, ammonia and methanol (of the ratio 5:5:5:5:3 parts by volume (see Journal of Chromatography 27 (1967), 413-422)) which could be identified by comparison with authentic samples of the compounds Ia, IIa and IIIa. The comparison compounds Ia and IIIa were prepared in known manner using in second condensation step 2 mols of aniline or morpholine and adding in the third step 6 mols of diethanolamine. The unsymmetrical comparison compound IIa was obtained starting from 4-nitro-4′-amino-stilbene-(2,2′)-disulfonic acid in the manner described above.

For the production of the triethanol ammonium salts as concentrated liquid preparations the reaction product obtained as described above was, after precipitation with a mineral acid, mixed moist with 110 parts of triethanolamine, made up to 460 parts with water and stirred. The so-obtained turbid solution could be clarified by filtration and a liquid preparation of about 25 percent strength (calculated on the free disulfonic acid) was obtained, practically capable of storage unlimited in time.

EXAMPLE 2

When the procedure indicated in Example 1 was followed and 35 parts of morpholine were added in the third condensation step in place of diethanolamine, there were obtained, after isolation of the reaction product with a mineral acid and after drying, 117 parts of disulfonic acids being a mixture of the components Ib, IIb and IIIb

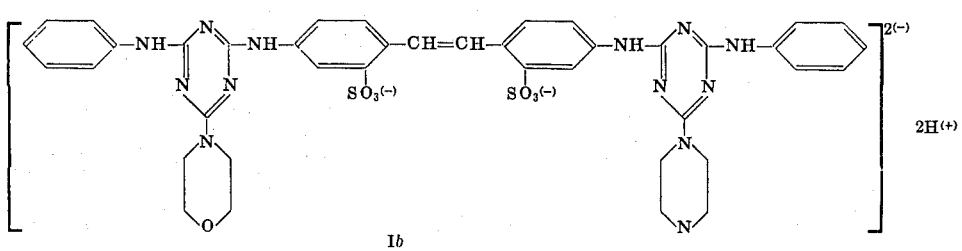

Ib

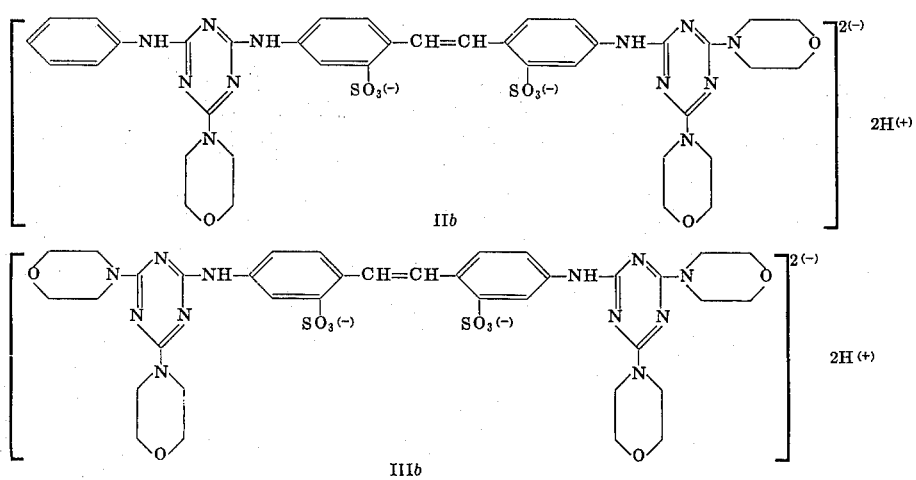

IIb

IIIb and corresponding to a yield of 95 percent of the theory taking into account a residual moisture of about 5 percent.

EXAMPLE 3

A cotton fabric prebleached in known manner with hydrogen peroxide was, after drying, impregnated with a solution containing 2 g/l of the composition of the compounds I*a*, II*a* and III*a* prepared according to the invention, squeezed off between rollers up to a moisture content of 80 percent and dried at 120° C. The fabric treated in said manner showed an excellent degree of whiteness of a bluish tint.

EXAMPLE 4

A knit fabric made from prebleached cotton was treated in a bleaching bath containing 0.4 percent of a composition of compounds I*b*, II*b* and III*b* prepared according to the invention and neutralized with sodium carbonate, 2 g/l of sodium silicate (38°Be), 1 g/l of sodium carbonate and 4 ml/l of hydrogen peroxide of 35 percent strength. Per 1 kg of fabric 10 1 of the said treating bath were used which was passed through the fabric during the bleaching operation, by means of an appropriate mechanical equipment. The treating bath was heated for 30 minutes to 110° C., and the fabric remained therein, at the said temperature, for another 30 minutes. After it had been rinsed and dried, the thus treated fabric showed an excellent degree of whiteness.

EXAMPLE 5

A knit fabric made from polyamide 6 was treated at a goods-to-liquor ratio of 1 : 10 with a bath containing 0.2 percent of the composition of compounds I*a*, II*a* and III*a* prepared according to the invention and 1 ml of formic acid. The temperature of the bath was raised to 80° C., and the goods agitated therein for 30 minutes. After rinsing and drying the knit polyamide fabric showed an excellent degree of whiteness of a bluish tint.

We claim

1. A composition of matter consisting essentially of a mixture of compounds of the formulae

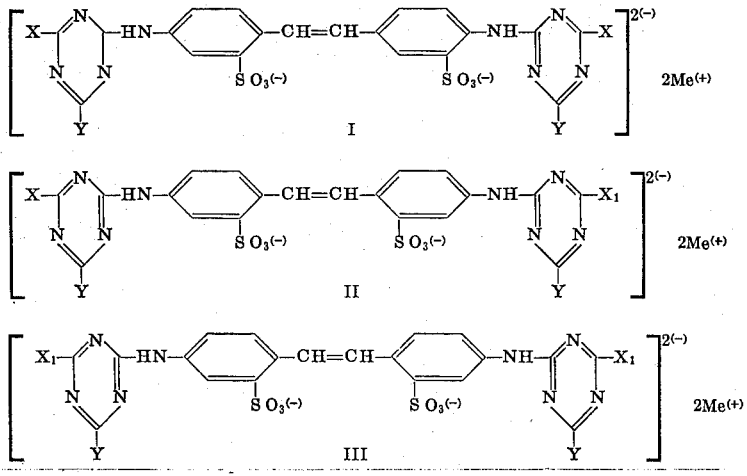

in which X is anilino, $X_1$ is morpholyl, Y, which is the same on each triazinyl and in each of I, II and III, is morpholyl or diethanolamine, and Me is hydrogen, alkali metal, ammonium or a quaternary ammonium derived from a low-molecular primary, secondary or tertiary aliphatic amine, said compounds I, II and III present in a molar ratio of about ¼: about ½: about ¼, respectively.

2. The composition as claimed in claim 1, consisting of about 25 mol percent of compound I, about 50 mol percent of compound II and about 25 mol percent of compound III.

3. The composition as claimed in claim 1, wherein ME is $H_3NCH_2CHB2OH$, $H_2N(CH_2CH_2OH)_2$ or $HN(CH_2CH_2OH)_3$.

4. The composition as claimed in claim 1, wherein Y is $N(CH_2CH_2OH)_2$ and Me is sodium.

5. The composition as claimed in claim 1, wherein Y is $N(CH_2CH_2OH)_2$ and Me is $HN(CH_2CH_2OH)_3$.

6. The composition as claimed in claim 1, wherein Y is morpholyl and Me is hydrogen.

7. The composition as claimed in claim 1, wherein Y is morpholyl and Me is sodium.

* * * * *